United States Patent [19]
Brännland et al.

[11] Patent Number: 5,423,958
[45] Date of Patent: Jun. 13, 1995

[54] ACIDITY CONTROL IN CHLORINE DIOXIDE MANUFACTURE

[75] Inventors: Rolf C. A. Brännland, Bromma; Sture E. O. Noréus, Husum, both of Sweden

[73] Assignee: Eka Nobel AB, Bohus, Sweden

[21] Appl. No.: 204,357

[22] PCT Filed: Sep. 12, 1991

[86] PCT No.: PCT/SE91/00605
§ 371 Date: Mar. 11, 1994
§ 102(e) Date: Mar. 11, 1994

[87] PCT Pub. No.: WO93/04979
PCT Pub. Date: Mar. 18, 1993

[51] Int. Cl.⁶ .................. C25B 1/16; C25B 1/22
[52] U.S. Cl. .................. 204/98; 204/104; 204/129; 423/478

[58] Field of Search .............. 204/101, 103, 104, 98, 204/129, 93; 423/478

[56] References Cited

U.S. PATENT DOCUMENTS

| | | | |
|---|---|---|---|
| 4,129,484 | 12/1978 | Larsson | 204/101 |
| 4,678,655 | 7/1987 | Twardowski | 423/478 |
| 5,227,031 | 7/1993 | Sundblad | 204/104 |

FOREIGN PATENT DOCUMENTS

| | | |
|---|---|---|
| 0353367 | 2/1990 | European Pat. Off. . |
| 1292102 | 10/1972 | United Kingdom . |
| 91/18830 | 12/1991 | WIPO . |

*Primary Examiner*—Kathryn Gorgos
*Attorney, Agent, or Firm*—Leydig, Voit & Mayer

[57] ABSTRACT

A method for generating chlorine dioxide by reduction of sodium chlorate includes electrolyzing sodium sulfate by-product to form acid. The acid is then used to acidify the chlorine dioxide generating solution.

11 Claims, 1 Drawing Sheet

ACIDITY CONTROL IN CHLORINE DIOXIDE MANUFACTURE

TECHNICAL FIELD

The present invention relates to a method for technically producing chlorine dioxide intented for bleaching cellulose pulp produced, for instance, chemically, such as sulphate pulp or sulphite pulp, and involving a more effective use of the chemicals used by combining the manufacturing process with an electrolysis process for the purpose of controlling acidity in the generation of chlorine dioxide.

BACKGROUND ART

Chlorine dioxide is manufactured on a technical scale, by reacting sodium chlorate in aqueous solution with a suitable reductant. Conventional reductants are sulfur dioxide, sodium chloride, hydrogen chloride and methanol, although other inorganic substances are also mentioned in the literature, such as nitrogen dioxide and sulfur, or organic substances such as ethanol and oxalic acid. Experience and scientific research have shown that the reduction of the chlorate shall be carried out in a strongly acid solution. Sulfuric acid or hydrochloric acid (hydrogen chloride) are the substances most commonly used to effect such acidification.

Subsequent to the chlorate having been consumed, there remains a strongly acid solution of sulfuric acid and sodium, or hydrochloric acid and sodium chloride, so-called spent acid. Sulfur containing spent acid has hitherto been used as a make-up chemical in the pulp mills, wherein the acid has been utilized to cleave or split tall oil soap for the production of tall oil, and the sodium is used to make up alkali losses and sulfur losses in the cooking chemical system of the pulp mills.

A modern variant of the chlorine dioxide process is based on reacting a mixture of sodium chloride and sodium chlorate in a solution which is acidified with sulfuric acid. The reaction takes place under vacuum conditions, 10–57 kPa, at a temperature of 45°–85° C. A mixture of water vapour (steam), chlorine dioxide and chlorine departs during this reaction. The reaction is represented by the formula:

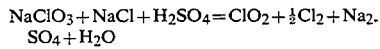

In view of present-day requirements on the limited use of chlorine and hypochlorite in pulp bleaching processes, it is desirable to limit the amount of molecular chlorine formed. This can be achieved by also using sulfur dioxide as a reductant in accordance with the formula:

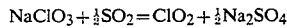

Sulfur dioxide can also be used to absorb in an aqueous solution chlorine gas which has not dissolved in the water washing tower used to produce chlorine dioxide water. This results in a mixed acid according to the formula:

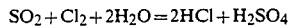

This mixed acid car, be returned to the chlorine dioxide reactor. Flows of sodium chlorate, sodium chloride and sulphuric acid are delivered to the reactor. The reaction products chlorine dioxide and chlorine are absorbed in a tower to which pure water is delivered and which produces a liquid which contains chlorine dioxide and chlorine. The residual gas from the absorption tower is passed to a reaction vessel, to which sulfur dioxide and water are supplied. The resultant mixed acid is passed back to the reactor. Crystals of sodium sulfate ($Na_2SO_4$) formed in the chlorine dioxide reactor are pumped to a filter and ejected, whereas the mother liquor is returned to the reactor.

According to one alternative embodiment, methanol is used as a reductant, which is supplied to the reactor along with sodium chlorate and sulfuric acid. The chlorine dioxide gas formed is passed to a tower in which the gas is absorbed in water, and the resultant bleaching liquid is passed to the bleaching department. Crystals of sodium sesquisulfate ($Na_3H[SO_4]_2$) formed in the chlorine dioxide reactor are pumped to a filter and ejected, whereas the mother liquor is returned to the reactor. The following reaction formulas are representative of this embodiment:

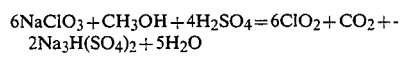

respectively

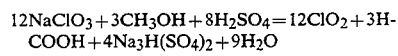

DISCLOSURE OF THE INVENTION

The Technical Problem

In recent times, the chemical systems of pulp mills have been closed very effectively and the need for make-up chemicals has therewith decreased. At the same time, the use of chlorine dioxide has increased very considerably; in that, chlorine has been replaced, inter alia, with chlorine dioxide to a great extent, for environmental reasons.

This has resulted in an imbalance which, in turn, has resulted in an excess of spent acid. The situation has been alleviated to some extent by the introduction of methods in which the sulphate formed, in some cases sesquisulfate ($Na_3H[SO_4]_2$) and in other cases neutral sulfate ($Na_2SO_4$) has been removed from the generating liquid in the form of solid crystals. This enables a certain amount of acid to be saved and also limits loading the pulp mill with undesirable sulfur.

A further complication with this decrease in the consumption of chlorine consumption is that sodium hydroxide, which is formed in equivalent quantities with chlorine in the electrolysis of sodium chloride (table salt) has become scarce. It is, therefore, necessary to look for alternative methods of producing sodium hydroxide.

The Solution

The present invention solves these problems and relates to a method for generating chlorine dioxide, by reducing a chlorate solution in the presence of hydrogen ions at a pH-value below 7 with the use of one or more reductants and a sulfur-containing compound in the form of a reductant and/or an acid, characterized by maintaining the hydrogen ion concentration (the acidity) in the chlorine dioxide generating process, completely or partially, with the aid of acid obtained by the electrolysis of a solution of sodium sulfate ($Na_2SO_4$ or $Na_3H[SO_4]_2$), produced by crystallization and redissolution of sodium sulfate formed during the chlorine dioxide generating process, the electrolysis being restricted so that part of the sodium sulfate is recycled to the chlorine dioxide generating process together with the acid formed.

The crystals of sodium sulfate formed in the chlorine dioxide generating process are separated on a filter and redissolved and passed to the anode chamber and there subjected to electrolysis in, for instance, a membrane cell provided with a unipolar cation-selective membrane. Part of the sodium ions in the sodium sulfate solution is caused to pass the membrane and forms sodium hydroxide in the cathode chamber; this sodium hydroxide being removed from said chamber and used, preferably in the alkaline bleaching stage of the pulp mill. The remaining acid sulfate/sulfuric acid solution is tapped off. Part of this acid solution is removed from the system and used, for instance, for the production of tall oil in the sulfate mill, and its corresponding sodium content is used, for instance, to make-up alkali losses in the cooking chemical system of the mill.

The remainder of this acid solution is preferably subjected to evaporation, so as to maintain the water balance in the system. After the evaporation, the acid solution is returned to the chlorine dioxide generator and there used to control the acidity in the process.

In order to utilize the vaporized water, it is suitable to pass this water vapour to the crystal dissolving vessel. Furthermore, the water can be vaporized at a pressure level such that the vapor formed can be used to heat the solution in the chlorine dioxide generator.

In order to further save chemicals, the mixed acid formed by reduction of chlorine gas with sulfur dioxide can be used to acidify the pulp prior to the first bleaching stage, in those instances when chlorine has been replaced to a great extent with chlorine dioxide and the initial acidity in the bleaching process is too low. The mixed acid used for this purpose can be replaced in the chlorine dioxide generating process with chlorine-free acid generated in the electrolysis cell.

By adapting the outtake of sodium sulfate, acid and alkali in relation to the chlorine dioxide generation, tall oil cooking and chemical losses in the pulp mill, it is possible, in each individual case, to minimize the total amount of chemicals used and to control the acidity in the chlorine dioxide generating process in a satisfactory manner. Part of the acid required to control acidity can be taken from an external source, in order to further increase flexibility.

Practical tests have been carried out with a simple membrane cell provided with an iron cathode, platinated titanium anode and a unipolar cation-selective membrane of perfluoro. sulfonic acid or perfluorocarboxylic acid, i.e. the type that has long been used in the production of chlorine and alkali by electrolytic decomposition of sodium chloride. These tests have shown that the sodium sulfate obtained in crystal form in the chlorine dioxide generating process can be worked-up surprisingly easily. The salt is dissolved in pure water, such as to obtain a concentration of about 400 g/l $Na_2SO_4$; this solution being delivered continuously to the electrolysis plant.

In principle, it is possible to decompose completely the sodium sulfate to sulfuric acid and sodium hydroxide, although practical tests have shown that it is suitable to limit the degree of decomposition (the degree of conversion) to 40–80%, since the current yield falls with higher contents of acid and alkali in the anode and cathode chambers, respectively. The hydrogen ion concentration of the liquid tapped from the anode chamber is then 2–5 val/l. For similar reasons, it is suitable to add water in an amount such as to limit the sodium hydroxide concentration to 100–200 g/l NaOH.

According to one preferred embodiment of the invention, the electrolysis vessel is divided by means of a membrane into a chamber for the cathode and a chamber for the anode. Sodium sulfate solution is supplied through a conduit and converted solution containing sulfuric acid, possibly with residual non-converted sodium sulfate, is removed through another conduit. Oxygen gas is generated at the anode. Sodium ions diffuse through the cation-selective membrane, where they form sodium hydroxide at the cathode and hydrogen gas is generated at the same time. Pure water is delivered through a conduit and the sodium hydroxide formed is removed through another conduit. It is also possible to use other types of electrolysis cells, although the effectiveness of these cells is somewhat lower.

Advantages

The invention has enabled the consumption of acid and alkali in a pulp mill to be reduced considerably, by combining acid and alkali consuming processes with an electrolytic process, wherein salts which are formed in the chlorine dioxide generating process are decomposed to their individual constituents and reused. At the same time, the biproducts oxygen gas and hydrogen gas are obtained, which can be utilized in the pulp manufacturing process for bleaching and for steam generation respectively.

Furthermore, the invention enables the quotient between acid requirements in the production of tall oil and the sulfate requirements for making-up losses in the cooking chemical cycle to be varied in accordance with the local conditions. Also of great value are the chemicals sodium hydroxide, oxygen gas and hydrogen gas formed in accordance with the invention and utilized within the pulp manufacturing process.

This reuse of chemicals improves the economy of pulp manufacture and also reduces the load on the environment caused by the emission of non-consumed chemicals.

BEST MODE OF CARRYING OUT THE INVENTION

In the following, preferred embodiments of the invention are described with reference to the Figures, and an account of the results achieved in accordance with the invention is also given.

EXAMPLE 1

Figure 1:
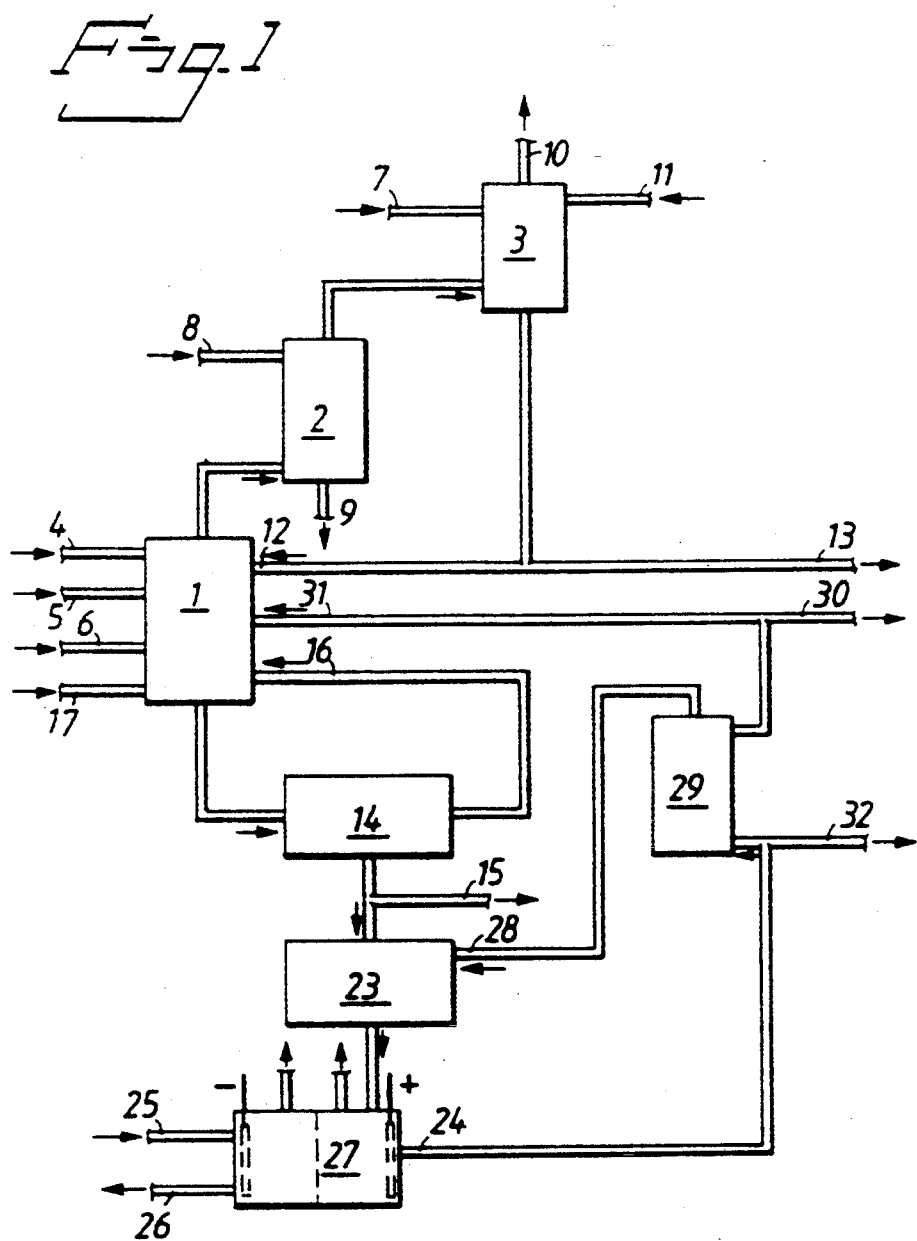
FIG. 1 is a flow sheet pertaining to a preferred embodiment of the invention.

Tests were carried out in accordance with the invention with the use of a chlorine dioxide generating plant which, in principle, operated in accordance with FIG. 1 with the use of sodium chloride as a reductant for the chlorate in the reactor 1 and with sulfur dioxide as the reductant in the absorption tower 3.

The reactor 1 was operated under the following conditions:

| | |
|---|---|
| Temperature | 70° C. |

-continued

| | |
|---|---|
| Pressure | 30.7 kPa |
| Acidity | 4.4 val/l |
| Amount of chlorate supplied (4) | 1300 kg/h ($NaClO_3$) |
| Amount of chloride supplied (5) | 585 kg/h (NaCl) |
| Amount of chlorine dioxide produced (9) | 800 kg/h ($ClO_2$) |
| Amount of chlorine produced | 361 kg/h ($Cl_2$) |
| Crystal concentration ($Na_2SO_4$-crystals) | 10% |
| Amount of crystals removed | 2141 kg/h ($Na_2SO_4$) |
| Amount of steam supplied | 6500 kg/h |

The generated mixture of chlorine dioxide and chlorine gas was transported to the absorption tower 2 with the aid of steam, where 100 m²/h cooled water (10° C.) was delivered through the line 8. Practically, all chlorine dioxide was dissolved in this water, although only 168 kg/h chlorine gas dissolved, and the water was pumped to the bleaching department of the mill, through the line 9. Remaining chlorine gas, 193 kg/h, was passed further to the reactor 3, where the chlorine gas was reacted with 170 kg/h sulfur dioxide supplied through the line 7, and 1100 l/h water supplied through the line 11. Of the mixed acid formed, 720 l/h was returned to the reactor 1 through the line 12, whereas 380 l/h was passed to acidification of unbleached pulp upstream of the first bleaching stage, through the line 13, The residual gas was removed through the line 10.

An amount of 2141 kg/h crystals of sodium sulfate were taken out of the circulation circuit 16 over a filter 14 and were dissolved in 5352 l/h water in the vessel 23; this water being delivered mainly from the evaporator 29, through the line 28. The solution obtained was delivered to the electrolysis plant 27 which was operated so that 75% of the sulfate was converted to sulfuric acid and sodium hydroxide and the sulfuric acid being obtained in mixture with the sodium sulfate in the anode chamber and tapped-off through the line 24. The composition of the acid solution was then:

| | |
|---|---|
| $Na_2SO_4$ | 79 g per kg solution |
| $H_2SO_4$ | 163 g per kg solution |

Pure water was supplied to the cathode chamber through the line 25, and 9000 l/h sodium hydroxide having a 10% concentration, corresponding to 904 kg/h NaOH, was tapped-off through the line 26. In addition, 127 m³/h oxygen gas (181 kg/h) was generated in the anode chamber, and 253 m³/h hydrogen gas (22.6 kg/h) was generated in the cathode chamber.

The acid solution was pumped through the line 24 to the evaporation vessel 29, which was operated under vacuum conditions, 50 kPa and 82° C. 4614 kg/h water were evaporated and passed to the dissolving tank 23. The concentrated acid now had the composition:

| | |
|---|---|
| $Na_2SO_4$ | 225 g per kg solution |
| $H_2SO_4$ | 465 g per kg solution |

Of this solution, 5% was passed to the tall oil cooking department of the sulfate mill through the line 30, for decomposition of tall oil soap, and 95% to the chlorine dioxide generator, through the line 31.

As a result of this recirculation of acid, it was possible to maintain the acidity in the generation of chlorine dioxide, without needing to supply acid from an external source. The following savings were made possible in this example:

| | |
|---|---|
| Sulfuric acid | 1108 kg/h |
| Sodium hydroxide | 904 kg/h |
| Oxygen gas | 181 kg/h |
| Hydrogen gas (fuel) | 22.6 kg/h |
| Sodium sulfate | 24 kg/h |

The power consumed by the electrolysis process was 3460 kW at a current density of 30 A/dm², 70° C. and the recited concentrations of acid and alkali.

EXAMPLE 2

According to another embodiment of the invention, sodium chloride was similarly used as the reductant for the chlorate in the reactor 1 and sulfur dioxide as the reductant in the absorption tower B, although with the difference in relation to Example 1 that no solution was returned to the reactor 1 from the absorption tower 3.

The reactor 1 worked under the following conditions:

| | |
|---|---|
| Temperature | 70° C. |
| Pressure | 30.7 kPa |
| Acidity | 4.2 val/l |
| Amount of chlorate supplied (4) | 1300 kg/h ($NaClO_3$) |
| Amount of chloride supplied (5) | 702 kg/h (NaCl) |
| Amount of chlorine dioxide produced (9) | 800 kg/h ($ClO_2$) |
| Amount of chlorine produced | 432 kg/h ($Cl_2$) |
| Crystal concentration ($Na_2SO_4$-crystals) | 9% |
| Amount of crystals removed | 3436 kg/h ($Na_2SO_4$) |
| Amount of steam delivered | 7000 kg/h |

The generated mixture of chlorine dioxide and chlorine gas was transported to the absorption tower 2 with the aid of steam, where 90 m³/h cooled water (10° C.) were supplied through the line 8. Practically, all chlorine dioxide dissolved in this water, but only 170 kg/h chlorine gas, and the water was pumped to the bleaching department of the mill, through the line 9. Remaining chlorine gas, 262 kg/h, was passed further to the reactor 3, where it was reacted with 236 kg/h sulfur dioxide supplied through the line 7 and 1500 l/h water supplied through the line 11. Of the mixed acid formed, 500 l/h were used to acidify unbleached pulp upstream of the first bleaching stage and were removed through the line 13, while the remainder was passed to a discharge outlet subsequent to neutralization with dust from the lime kiln filter.

An amount of 3436 kg/h crystals of sodium sulfate were removed from the circulation circuit 16 over a filter 14 and dissolved in 8590 l/h water in the vessel 23, the majority of this water being delivered from the evaporator 29, through the line 28. The resultant solution was delivered to the electrolysis plant 27, which was operated so that 50% of the sulfate was converted to sulfuric acid and sodium hydroxide, of which the sulfuric acid was obtained in mixture with the sodium sulfate in the anode chamber and tapped-off through the line 24. The composition of the acid solution was then:

| | |
|---|---|
| $Na_2SO_4$ | 152 g per kg solution |
| $H_2SO_4$ | 105 g per kg solution |

Pure water was delivered to the cathode chamber through the line 25, and 9600 kg/h sodium hydroxide having a concentration of 10%, corresponding to 968 kg/h NaOH were tapped-off through the line 26. In addition, 135 m³/h oxygen gas (194 kg/h) were generated in the anode chamber, and 271 m³/h hydrogen gas (24.2 kg/h) were generated in the cathode chamber.

The acid solution was pumped through the line 24 to the evaporation vessel 29, which was operated under vacuum conditions, 50 kPa and 82° C. An amount of 7071 kg/h water were evaporated and delivered to the dissolving tank 23. The concentrated acid now had the composition:

| $Na_2SO_4$ | 399 g per kg solution |
| $H_2SO_4$ | 275 g per kg solution |

This solution was returned to the chlorine dioxide generator through the line 31. This recycling of acid enabled the acidity of the chlorine dioxide generating process to be maintained without needing to supply acid from an external source. The example enabled the following savings to be made:

| Sulfuric acid | 1186 kg/h |
| Sodium hydroxide | 968 kg/h |
| Oxygen gas | 194 kg/h |
| Hydrogen gas (fuel) | 24.2 kg/h |

The power consumed by the electrolysis process was 2880 kW at a current density of 30 A/dm², 70° C., and the recited concentrations of acid and alkali.

EXAMPLE 3

According to a third embodiment of the invention, methanol was used as the reductant for the sodium chlorate in the aforesaid reactor 1, which operated under the following conditions:

| Temperature | 70° C. |
| Pressure | 30.7 kPa |
| Acidity | 6.1 val/l |
| Amount of chlorate supplied (4) | 1300 kg/h ($NaClO_3$) |
| Amount of methanol supplied (17) | 98 kg/h ($CH_3OH$) |
| Amount of chlorine dioxide produced (9) | 800 kg/h ($ClO_2$) |
| Crystal concentration ($Na_3H[SO_4]_2$-crystals) | 10% |
| Amount of crystals removed | 2133 kg/h ($Na_3H[SO_4]_2$) |
| Amount of steam supplied | 6000 kg/h |

Similar to Example 1, the chlorine dioxide gas was transported by steam to the absorption tower 2; although since the gas was practically free from chlorine, no reaction stage with $SO_2$-reduction was required and no mixed acid was produced in this case.

An amount of 2133 kg/h crystals were removed from the circulation circuit 16 over a filter 14 and dissolved in the vessel 23 in 4335 l/h water, which was supplied mainly from the evaporator 29. The resultant solution was delivered to the electrolysis plant 27, which was operated so that 50% of the sodium content of the sulfate was converted to sodium hydroxide. This was formed in the cathode chamber while adding 4800 l/h water and tapped-off at a concentration of 10% through the line 26, corresponding to an amount of 488 kg/h NaOH. In addition, 136 m/h hydrogen gas (12.2 kg/h) was generated in the cathode chamber, and 68 m³ oxygen gas (98 kg/h) was generated in the anode chamber.

The composition of the acid solution after electrolysis was:

| $Na_2SO_4$ | 143 g per kg solution |
| $H_2SO_4$ | 164 g per kg solution |

This solution was pumped through the line 24 to the evaporation vessel 29, which was operated under vacuum conditions, 50 kPa and 82° C. 3348 kg/h water were evaporated and delivered to the dissolving tank 23. The concentrated acid had the composition:

| $Na_2SO_4$ | 321 g per kg solution |
| $H_2SO_4$ | 369 g per kg solution |

This acid was supplied to the reactor 1 through the line 31. This recirculation of acid enabled the acidity to be maintained in the chlorine dioxide generating process without supplying acid from an external source. Acid from an external source, however, can be supplied through the line 6 if considered suitable. The example has enabled the following savings to be made:

| Sulfuric acid | 598 kg/h |
| Sodium hydroxide | 488 kg/h |
| Oxygen gas | 98 kg/h |
| Hydrogen gas (fuel) | 12.2 kg/h |

The electrolysis had a power consumption of 1650 kW at the current density of 30 A/dm², 70° C., and the recited acid and alkali concentrations. The invention is not limited to the cases described in Examples 1–3, but can also include chlorine dioxide generating processes which are based on reductants other than those mentioned here, or on combinations of generating processes, for instance reduction with sulfur dioxide in a first stage followed by a second stage with chloride reduction, whereafter sodium sulfate crystallizes out.

Figure 2:
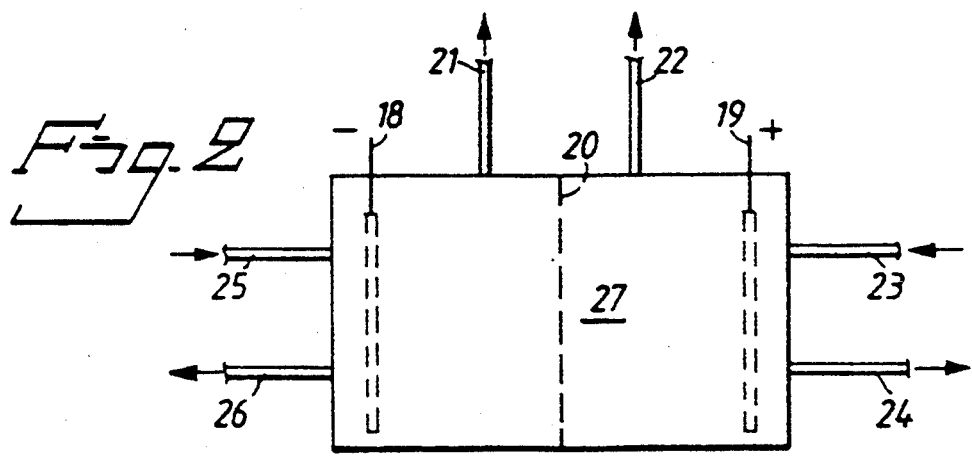
FIG. 2 illustrates the construction of a suitable electrolysis cell in more detail.

FIG. 2 illustrates a preferred embodiment of the electrolysis cell 27, which is provided with an iron cathode 18, a platinated titanium electrode 19 and a unipolar cation selective membrane 20. Hydrogen gas 21 is generated at the cathode and oxygen gas 22 is generated at the anode. A solution of sodium sulfate is delivered to the anode chamber through the line 23, and the acid formed is removed through the line 24. Pure water is supplied to the cathode chamber through the line 25, and the sodium hydroxide formed is removed through the line 26.

According to the invention, the chemical requirements of the sulfate mill can be covered by taking out flows from different points in the system, either separately or in combination. A crystal mass of sodium sulfate can be taken out through the line 15 in order to cover the sodium and sulfur requirement of the pulp mill. An acid, highly concentrated solution of sulfuric acid and sodium sulfate can be taken out through the line 30 for the production of tail oil. A dilute solution of corresponding composition appropriate in those instances when the evaporation capacity is found available in another location in the mill can be taken out through the line 32.

We claim:

1. A method for generating chlorine dioxide, comprising reducing a chlorate solution having of hydrogen ions at a pH below 7, and using one or more reductants and a sulfur-containing compound in the form of at least one of a reductant and an acid, wherein hydrogen ion concentration is maintained at least partially by adding acid obtained by electrolyzing a solution of sodium sulfate in the form of $Na_2SO_4$ or —$Na_3H(SO_4)_2$— produced by crystallization and aqueous redissolution of sodium sulfate formed in said chlorine dioxide generation process, electrolysis is restricted so that part of the sodium sulfate is recycled to the chlorine dioxide generating process together with the acid formed, and wherein the degree of conversion during electrolysis is from 40% to 80%.

2. A method according to claim 1, including the step of limiting the electrolysis of the sodium sulfate so that a hydrogen ion concentration in the solution departing from the electrolysis cell is at most 5 mol/l.

3. A method according to claim 2, wherein the hydrogen ion concentration in the solution departing from the electrolysis cell is between 2 and 4 mol/l.

4. A method according to claim 2, wherein the electrolysis is performed in a cell provided with an anode, a cathode and a cation-selective membrane, and wherein the process includes the steps of supplying sodium sulfate solution to an anode chamber of the cell, forming acid and oxygen gas at an anode and forming hydrogen gas at the cathode, and simultaneously supplying pure water to a cathode chamber of the cell, thereby forming sodium hydroxide in the cathode chamber.

5. A method according to claim 2, including returning the acid solution formed in an anode chamber of the chlorine dioxide generator, the water supplied by dissolution of the sodium sulfate is removed by evaporation of the water from at least one of the acid solution or the salt solution of the chlorine dioxide generator.

6. A method according to claim 2, including removing from the system an amount of sulfate corresponding to the amount of sulfur supplied to the system, said amount of sulfate comprising either sodium sulfate removed prior to the electrolysis stage, or acid sodium sulfate after the electrolysis stage.

7. A method according to claim 1, wherein the electrolysis is performed in a cell provided with an anode, a cathode and a cation-selective membrane, and wherein the process includes the steps of supplying sodium sulfate solution to an anode chamber of the cell, forming acid and oxygen gas at the anode and forming hydrogen gas at the cathode, and simultaneously supplying pure water to a cathode chamber of the cell, thereby forming sodium hydroxide in the cathode chamber.

8. A method according to claim 7, including returning the acid solution formed in an anode chamber of the chlorine dioxide generator, the water supplied by dissolution of the sodium sulfate is removed by evaporation of the water from at least one of the acid solution or the salt solution of the chlorine dioxide generator.

9. A method according to claim 7, including removing from the system an amount of sulfate corresponding to the amount of sulfur supplied to the system, said amount of sulfate comprising either sodium sulfate removed prior to the electrolysis stage, or acid sodium sulfate after the electrolysis stage.

10. A method according to claim 1, including the step of returning the acid solution formed in an anode chamber to the chlorine dioxide generator, the water supplied by dissolution of the sodium sulfate is removed by evaporation of the water from at least one of the acid solution or the salt solution of the chlorine dioxide generator.

11. A method according to claim 1, including removing from the system an amount of sulfate corresponding to the amount of sulfur supplied to the system, said amount of sulfate comprising either sodium sulfate removed prior to the electrolysis stage, or acid sodium sulfate after the electrolysis stage.

* * * * *